US007001098B2

(12) United States Patent
Lin et al.

(10) Patent No.: US 7,001,098 B2
(45) Date of Patent: Feb. 21, 2006

(54) LOCK STRUCTURE AND METHOD FOR USING THEREOF

(75) Inventors: Hsueh-Cheng Lin, Pingtung (TW); Jung-Huang Peng, Hsinchu (TW); Chin-Chen Chang, Taipei (TW); Chia-Fu Tsai, Tainan (TW); Zhen-Dao Shen, Taipei (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 17 days.

(21) Appl. No.: 10/600,723

(22) Filed: Jun. 20, 2003

(65) Prior Publication Data

US 2004/0258473 A1 Dec. 23, 2004

(51) Int. Cl.
*F16D 1/00* (2006.01)
(52) U.S. Cl. .................. 403/408.1; 403/194; 403/200; 403/201; 403/258; 403/388; 403/317; 403/320
(58) Field of Classification Search ............. 403/408.1, 403/188, 194, 200, 201, 256–258, 260–261, 403/388, 315–317, 320, 373, 374.1–374.3
See application file for complete search history.

(56) References Cited

U.S. PATENT DOCUMENTS

| 1,584,711 | A | * | 5/1926 | Astrom .................... 403/408.1 |
| 2,883,012 | A | * | 4/1959 | Hoffman .................. 403/408.1 |
| 3,006,443 | A | * | 10/1961 | Siler ......................... 403/408 |
| 4,277,923 | A | * | 7/1981 | Rebentisch et al. |
| 4,640,491 | A | | 2/1987 | Grist et al. .................. 249/219 |
| 4,647,257 | A | * | 3/1987 | Robishaw ............ 403/408.1 X |
| 5,010,708 | A | | 4/1991 | Evans et al. ................... 52/656 |
| 5,150,983 | A | | 9/1992 | Bogenhagen ............... 403/402 |
| 6,032,417 | A | | 3/2000 | Jakus et al. .................... 49/181 |
| 6,106,190 | A | * | 8/2000 | Nakamura et al. ....... 403/408.1 |
| 6,125,604 | A | | 10/2000 | Holmes ....................... 52/713 |
| 6,415,515 | B1 | * | 7/2002 | Wheeler et al. ......... 403/188 X |
| 6,442,906 | B1 | * | 9/2002 | Hwang |
| 6,585,447 | B1 | * | 7/2003 | Schwarzbich ............... 403/374 |
| 6,772,564 | B1 | * | 8/2004 | Leon |
| 2004/0109724 | A1 | * | 6/2004 | Tiemann |

FOREIGN PATENT DOCUMENTS

DE 3411285 A1 * 10/1985
FR 2570769 A1 * 3/1986

* cited by examiner

*Primary Examiner*—Daniel P. Stodola
*Assistant Examiner*—Victor MacArthur
(74) *Attorney, Agent, or Firm*—Thomas, Kayden, Horstemeyer & Risley

(57) ABSTRACT

A lock structure. The lock structure includes a first element, a second element, a guiding element and a fixing pin. The first element has a guide hole and a first through hole located under the guide hole. The second element is deposed under the first element and has a second through hole that is co-axially aligned with the first through hole. The guiding element rotates and is movably disposed in the guide hole. The guiding element has a third through hole aligned with the first through hole. The fixing pin is inserted through the third through hole, guide hole, first through hole and second through hole and has a first retaining portion. The first retaining portion is formed on the lower portion of the fixing pin and located under the second element.

13 Claims, 7 Drawing Sheets

LOCK STRUCTURE AND METHOD FOR USING THEREOF

BACKGROUND OF THE INVENTION

1. Field of the Invention

The present invention relates to a lock structure, and in particular to a lock structure for use in securing supporting plates of raised floor structures.

2. Description of the Related Art

In many facilities, like computer server rooms, semiconductor factories, etc., the computers and other equipment are often equipped with many peripheral devices that require wires and other cabling. To easily maintain the peripheral devices and wires, the equipment is disposed on raised floors, while the peripheral devices and wires are disposed under the raised floor.

Referring to FIG. 1A and FIG. 1B, a conventional raised floor 1 is composed of a plurality of planar supporting plates 11 that are interconnected to each other to form a support floor. Additionally, a plurality of pedestals 2 are disposed under the support floor 1 to support and elevate the floor 1. In order to prevent the supporting plates 11 from falling due to earthquakes, vibrations, or other movement, the supporting plates 11 are typically mounted on the pedestals 2 by bolts 3.

There are, however, many drawbacks to the use of bolts 3 to mount the supporting plates 11 on the pedestals 2. As shown in FIG. 1B, each supporting plate 11 generally requires four bolts 3 to be fixed on the pedestals 2. Thus, the time required for mounting and dismounting the supporting plates 11 is considerable. Further, since the supporting plates 11 are frequently mounted and dismounted to maintain the peripheral devices and wires of the machines, the threads of the bolts 3 or screw holes of the pedestals 2 are more likely to become stripped or damaged. This limits the lifecycle of the bolts used to mount the supporting plates 11 mounted on the pedestals 2. As mentioned above, manual labor is used in order to rapidly mount and dismount the supporting plates 11. Use of manual labor, however, increases the overall time required and is an unnecessary waste of labor.

U.S. Pat. Nos. 6,125,604, 6,032,417, 5,150,983, 5,010,708 and 4,640,491, disclose several conventional lock structures. Nevertheless, all these conventional lock structures employ conventional ways and constructions to combine two parts. The mounting and dismounting procedures and the constructions of the lock structures disclosed in these patents are generally complicated.

Hence, there is a need to provide an improved lock structure to overcome the aforementioned problems.

SUMMARY OF THE INVENTION

Accordingly, an object of the invention is to provide a lock structure, which realizes simplified installation or improved longevity. The lock structure comprises a first element, a second elements, a guiding element and a fixing pin. The first element has a guide hole and a first through hole located under the guide hole. The second element is disposed under the first element and has a second through hole that is co-axially aligned with the first through hole. The guiding element rotates and is movably disposed in the guide hole. The guiding element has a third through hole aligned with the first through hole. The fixing pin is inserted through the third through hole, guide hole, first through hole and second through hole and has a first retaining portion. The first retaining portion is formed on the lower portion of the fixing pin and located under the second element.

Preferably, the guide hole is circular and formed with inner threads.

Preferably, the guiding element is a hollow cylinder, and the outer surface of the guiding element is formed with outer threads engaging the inner threads of the guide hole.

Preferably, the cross sections of the first through hole, second through hole and third through hole correspond to the cross section of the first retaining portion of the fixing pin, and the first retaining portion pushes against the second element when the fixing pin rotates with an angle.

Preferably, the cross sections of the first retaining portion, first through hole, second through hole and third through hole are rectangular or substantially rectangular.

Preferably, the guiding element further comprises at least one second retaining portion formed in the third through hole.

Preferably, the fixing pin further comprises a third retaining portion formed on the upper portion of the fixing pin, and the second retaining portion pushes against the third retaining portion.

Preferably, a first groove is formed on the third retaining portion.

Preferably, a second groove is formed on the guiding element.

Preferably, the height of the guiding element is smaller than that of the guide hole.

Another object of the invention is to provide a method for using the lock structure to install supporting plates of a raised floor. The method comprises the steps of: (a) rotating a guiding element to advance it into the guide hole; (b) fitting a fixing pin into a through hole, guide hole, first through hole and second through hole to locate a first retaining portion thereof under the second element; (c) turning the fixing pin by a predetermined angle in a first direction to rotate the first retaining portion thereof by the predetermined angle; and (d) turning the guiding element to move it into the guide hole until the first retaining portion of the fixing pin pushes against the second element.

In one embodiment, the method further comprises the steps of: (e) turning the guiding element to move it into the guide hole and separate the first retaining portion of the fixing pin from the second element; (f) turning the fixing pin by the predetermined angle in a second direction opposite to the first direction to rotate the first retaining portion thereof by the predetermined angle; and (g) removing the fixing pin from the third through hole, guide hole, first through hole and second through hole to separate the first element from the second element.

In one embodiment, step (c) further comprises: (c1) inserting a tool in the first groove of the third retaining portion to turn the fixing pin.

In one embodiment, step (f) further comprises: (f1) inserting a tool in the first groove of the third retaining portion to turn the fixing pin.

In one embodiment, step (a) further comprises: (a1) inserting a tool in the second groove of the guiding element to turn the guiding element.

In one embodiment, step (d) further comprises: (d1) inserting a tool in the second groove of the guiding element to turn the guiding element.

In one embodiment, step (e) further comprises: (e1) inserting a tool in the second groove of the guiding element to turn the guiding element.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
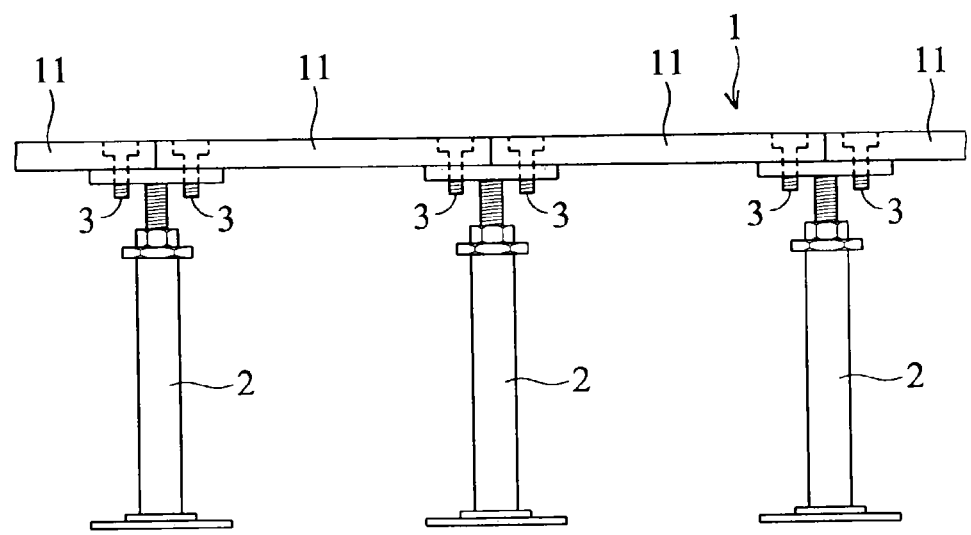
FIG. 1A is a side elevation view showing a conventional raised floor and pedestal.
Figure 1B:
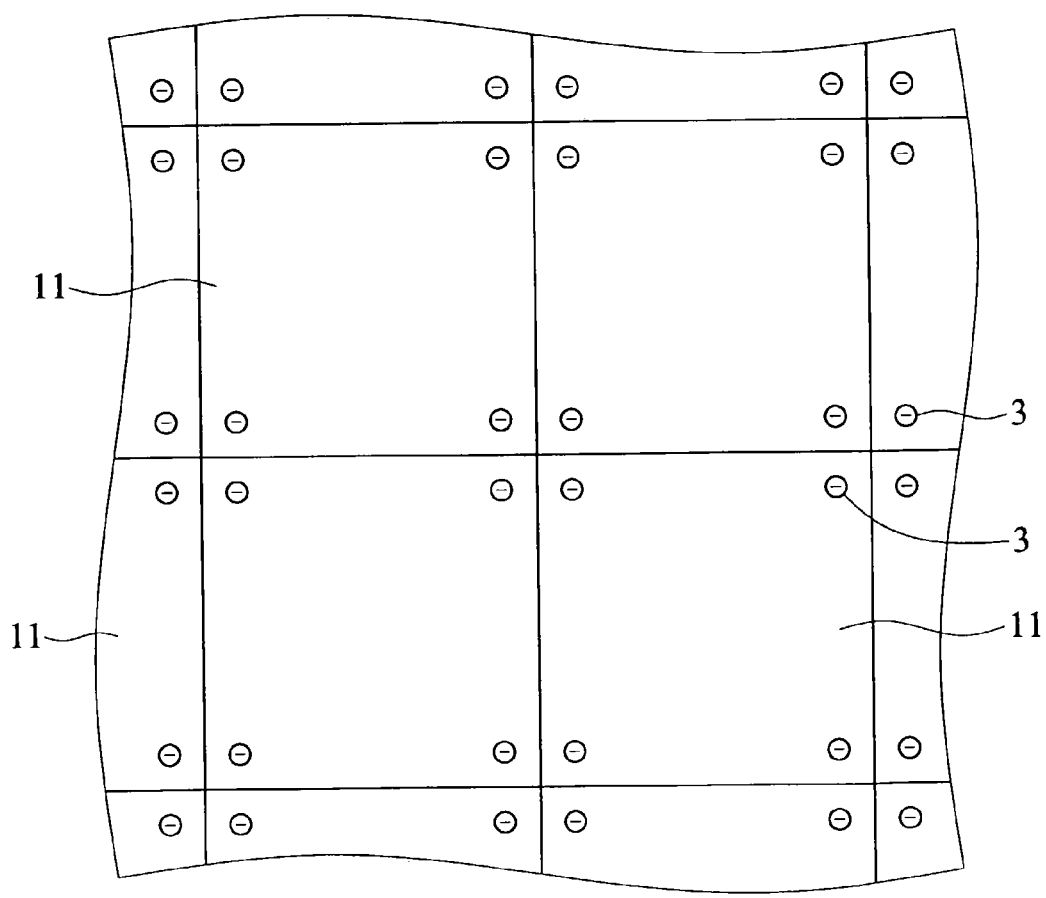
FIG. 1B is a schematic top view according to FIG. 1A.
Figure 2A:
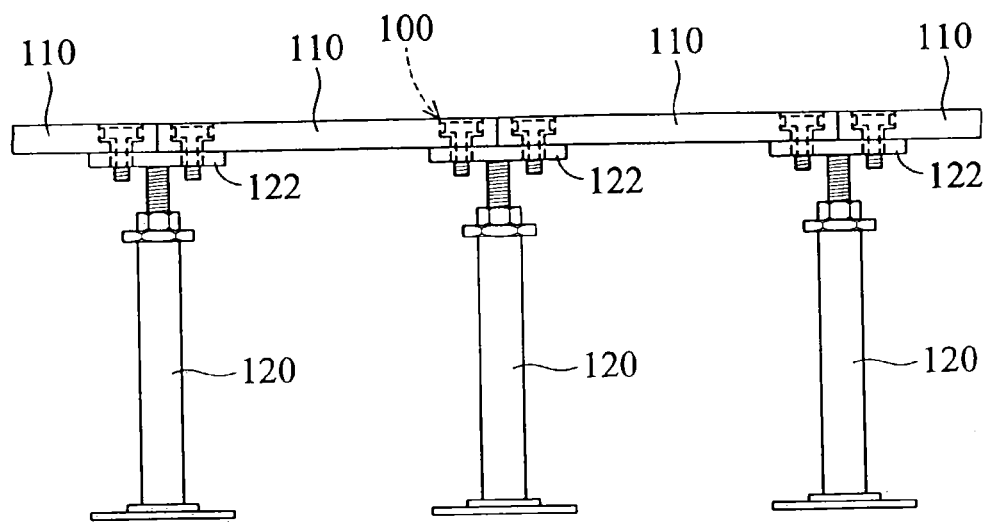
FIG. 2A is a side elevation view showing the supporting plates and pedestals of the invention.
Figure 2B:
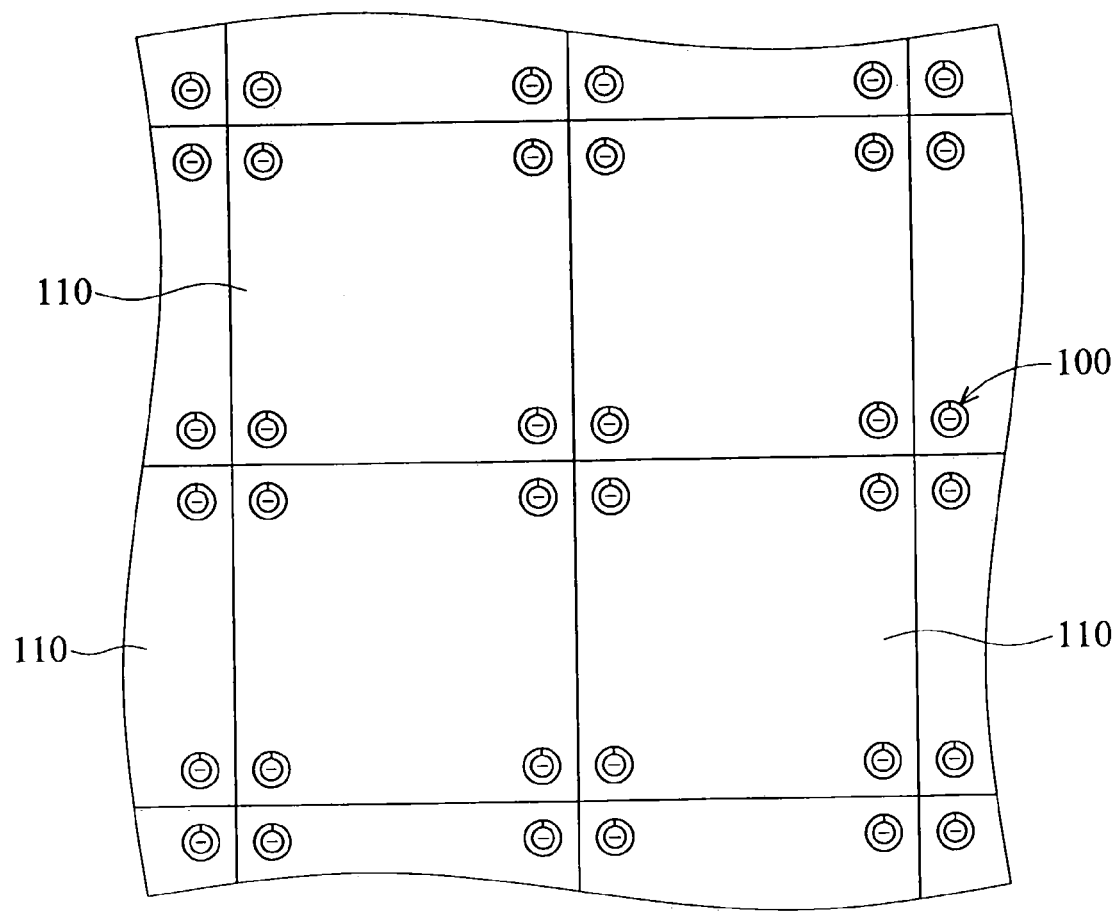
FIG. 2B is a top view according to FIG. 2A.
Figure 3:
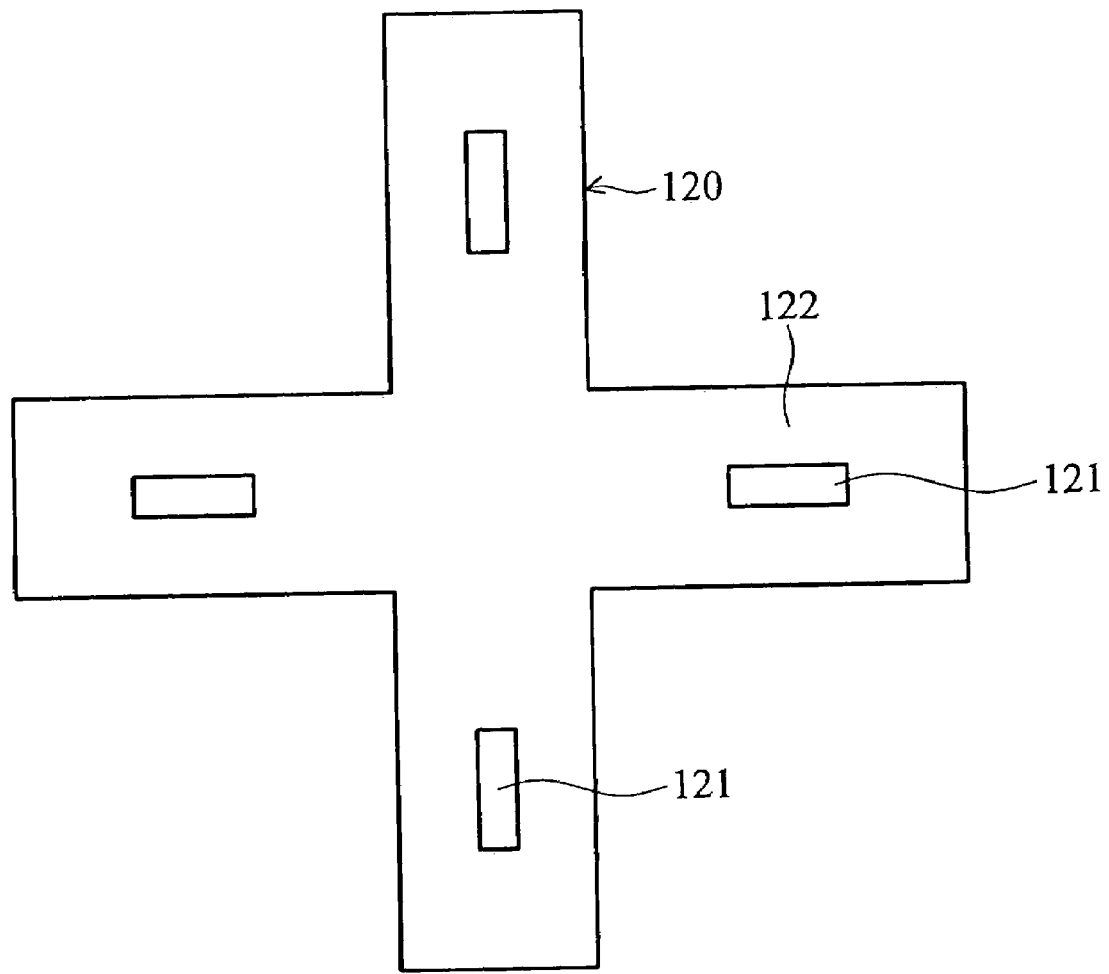
FIG. 3 is a schematic top view showing the second element (top of pedestal) of the lock structure of the invention.

As summarized above, the present invention is directed to a novel lock structure used for supporting a raised floor. Referring to FIG. 2A and FIG. 2B, the lock structures 100 are used to mount a plurality of supporting plates 110 on a plurality of pedestals 120. As shown in FIG. 3, the top of each pedestal 120 has a symmetric shape. In the illustrated embodiment, the top of each pedestal 120 is cross shaped. However, consistent with the scope and spirit of the invention, the top of each pedestal 120 may be other shapes as well. For example, the top of each pedestal 120 may be circular. In this regard, the top of each pedestal 120 is preferably sized and shaped to provide adequate support for the overlying supporting plates 110, which form the floor of the raised floor. Because the supporting plates 110 are symmetrically disposed on top of each pedestal 120, the following description is directed to one supporting plate 110 mounted on a pedestal 120 for simplification thereof.

Figure 4:
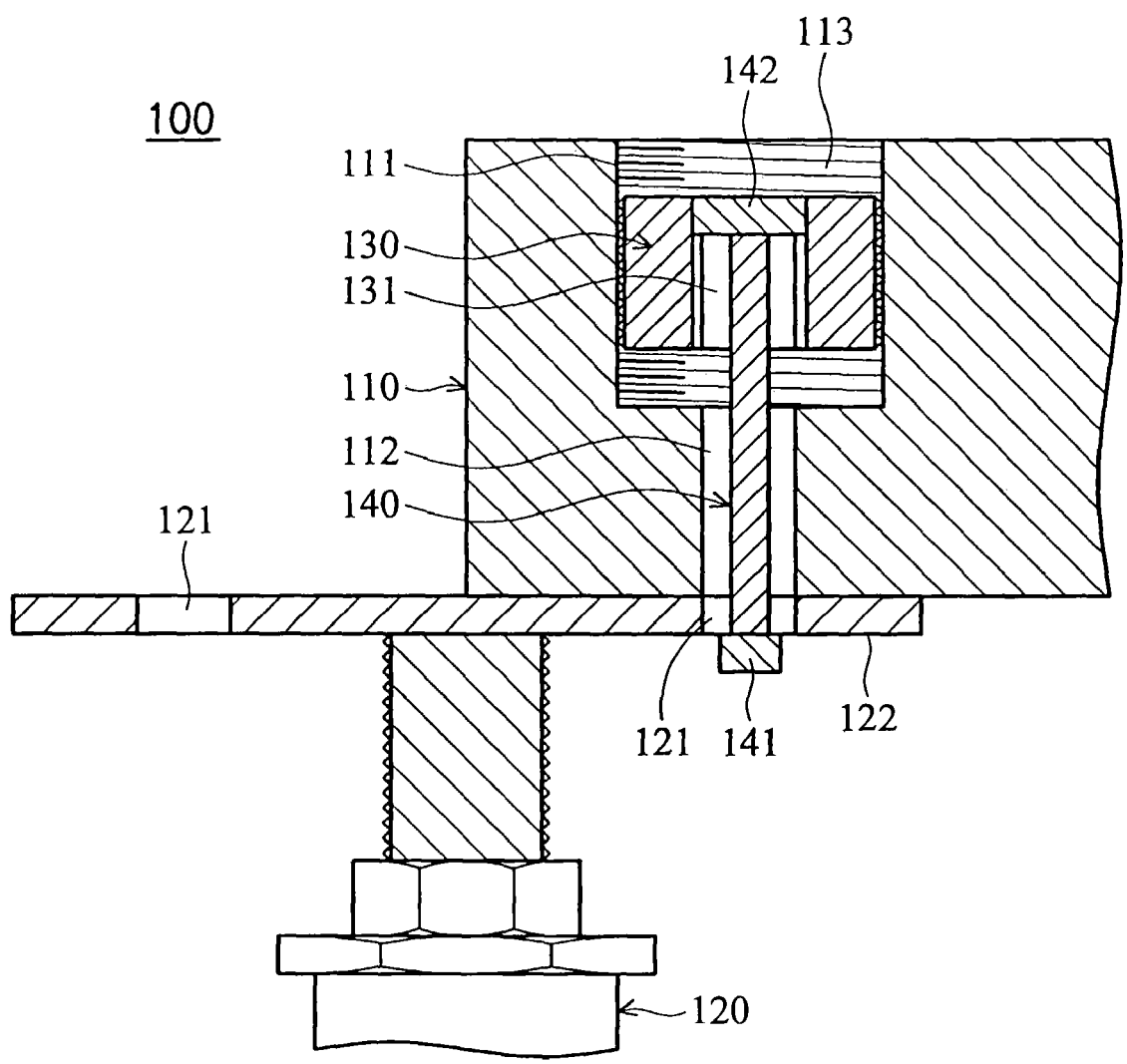
FIG. 4 is a schematic cross-sectional assembled view of the lock structure of the invention.
Figure 5:
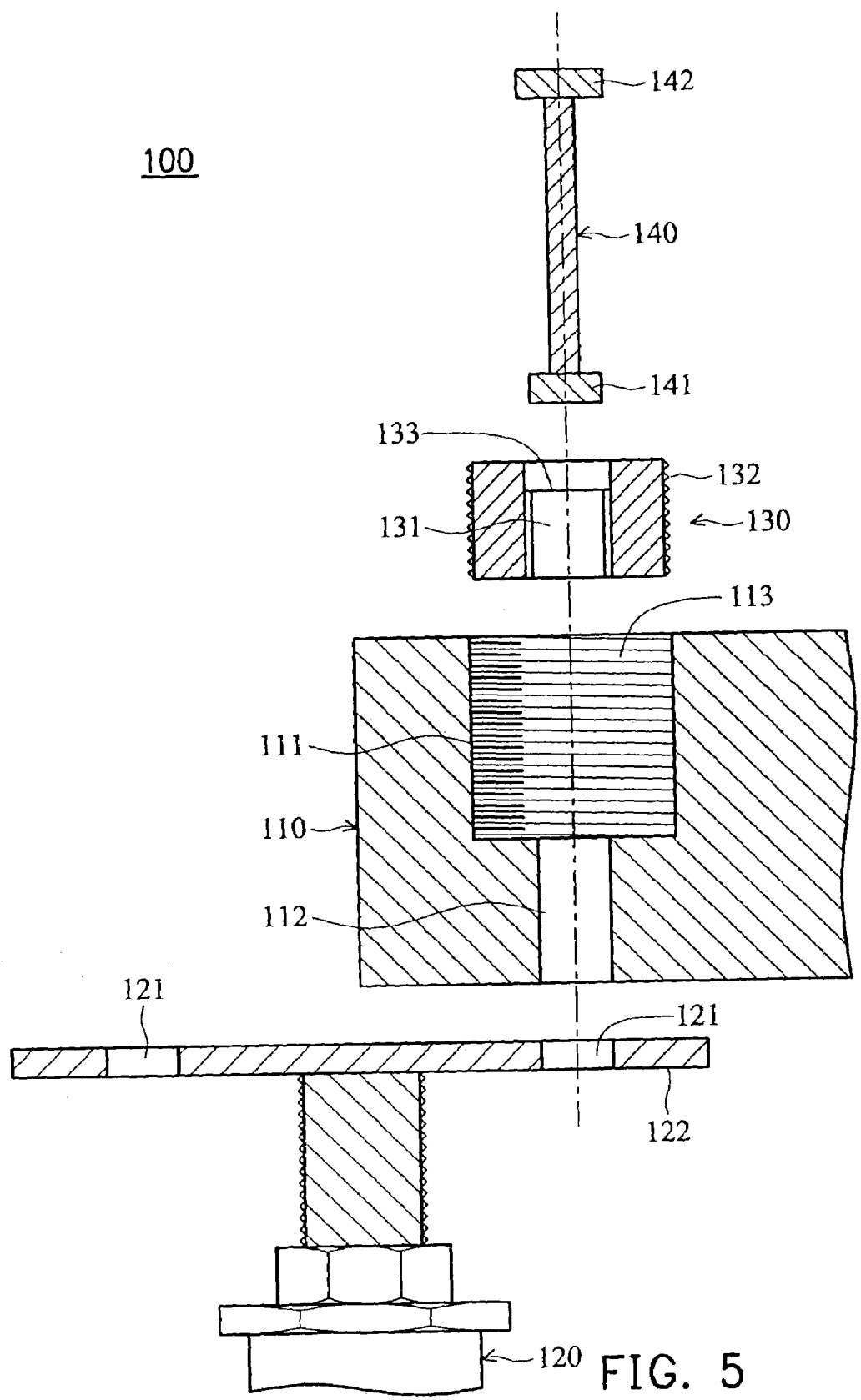
FIG. 5 is a schematic cross-sectional exploded view of the lock structure of the invention.

Referring to FIG. 4 and FIG. 5, the lock structure 100 comprises a first element (supporting plate) 110, a second element (top of pedestal) 122, a guiding element 130 and a fixing pin 140.

The first element 110 has a guide hole 111 and a first through hole 112. The guide hole 111 is connected to the first through hole 112 and located above the first through hole 112. Additionally, the guide hole 111 is circular and formed with inner threads 113.

The second element 122 is disposed under the first element 110 and has a second through hole 121. The second element 122 is positioned in relation to the first element 110, so that the second through hole 121 aligns with the first through hole 112.

Figure 6:
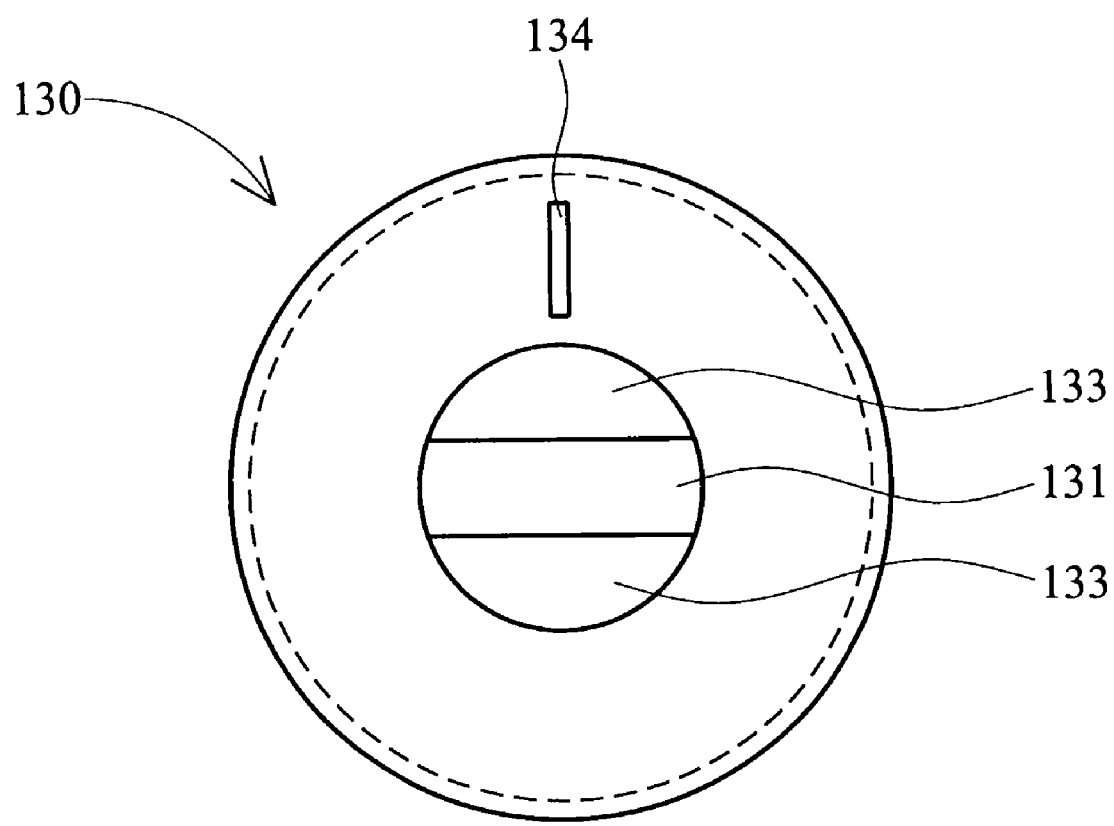
FIG. 6 is a schematic top view of the guiding element according to FIG. 5.

The guiding element 130 has a third through hole 131. The position of the third through hole 131 is co-axially aligned with the first through hole 112. Additionally, as shown in FIG. 5 and FIG. 6, the guiding element 130 is preferably a hollow cylinder, and the outer surface thereof is formed with outer threads 132. The outer threads 132 of the guiding element 130 engage the inner threads 113 of the guide hole 111, such that the guiding element 130 can be rotated to move upward and downward in the guide hole 111.

The fixing pin 140 is fit into the third through hole 131, guide hole 111, first through hole 112 and second through hole 121 in sequence. Meanwhile, a first retaining portion 141 is formed on the lower portion of the fixing pin 140. After the fixing pin 140 is fit into the third through hole 131, guide hole 111, first through hole 112 and second through hole 121 in sequence, the first retaining portion 141 is located under the second element 122 or second through hole 121.

The detailed construction of the lock structure 100 is described as follows.

Figure 7:
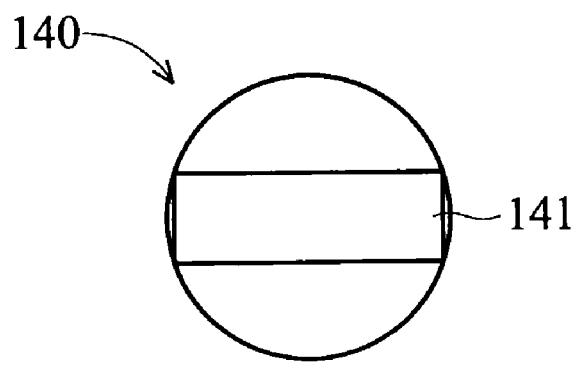
FIG. 7 is a schematic bottom view of the fixing pin according to FIG. 5.
Figure 8:
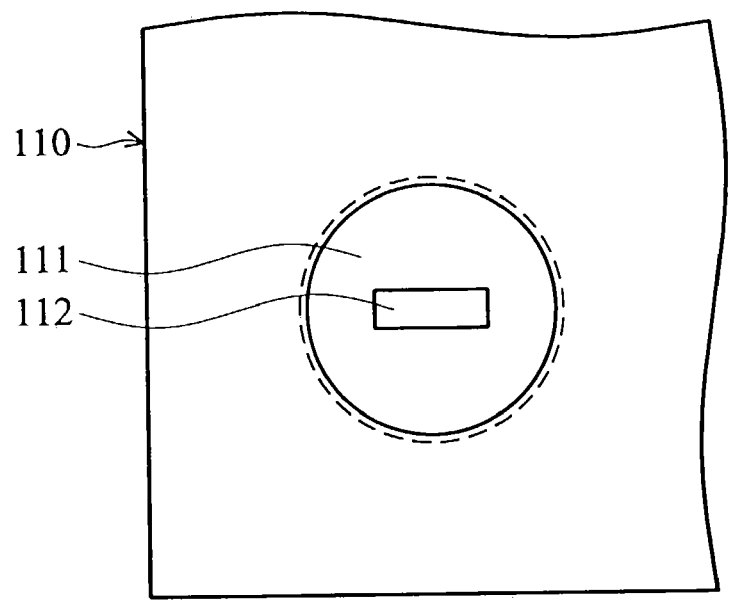
FIG. 8 is a schematic partial top view of the first element according to FIG. 5.

Referring to FIG. 7, the first retaining portion 141 of the fixing pin 140 has a rectangular cross section. In order to smoothly fit the first retaining portion 141 into the third through hole 131, guide hole 111, first through hole 112 and second through hole 121, the cross sections of the third through hole 131, first through hole 112 and second through hole 121 are aligned to the cross section of the first retaining portion 141. Namely, the cross sections of the third through hole 131, first through hole 112 and second through hole 121 have cross sections sufficient to accommodate the insertion of the cross section of the first retaining portion 141, as shown in FIG. 3, FIG. 6 and FIG. 8. Thus, after the fixing pin 140 is inserted, it is rotated (clockwise or counterclockwise) by preferable 90 degrees. This orients the first retaining portion 141 of the fixing pin 140 to substantially engage (or push against) the second element 122. Specifically, the cross sections of the first retaining portion 141, first through hole 112, second through hole 121 and third through hole 131 are not limited to rectangular shapes. These cross sections may be substantially rectangular.

Figure 9:
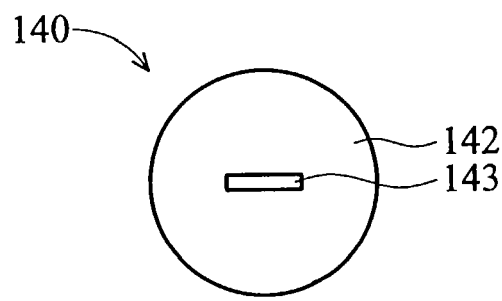
FIG. 9 is a schematic top view of the fixing pin according to FIG. 5.
Figure 10:
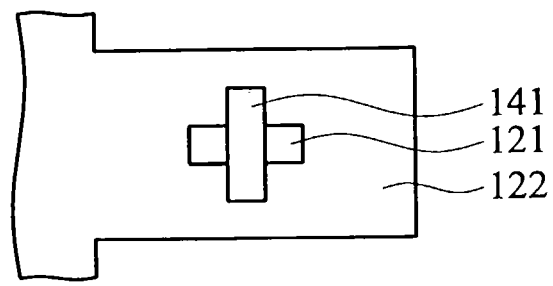
FIG. 10 is a schematic partial bottom view according to FIG. 4.

In addition, as shown in FIG. 5 and FIG. 6, the guiding element 130 has two second retaining portions or abutments 133 formed in the third through hole 131. As shown in FIG. 5 and FIG. 9, a third retaining portion 142 is formed on the upper part of the fixing pin 140. When the fixing pin 140 is inserted into the third through hole 131, guide hole 111, first through hole 112 and second through hole 121 in sequence, the third retaining portion 142 of the fixing pin 140 abuts against the second retaining portions 133 of the guiding element 130. Then, when the guiding element 130 is rotated to move upward (away from the second element 122 of the pedestal support 120), the first retaining portion 141 of the fixing pin 140 firmly pushes against the second element 122, as shown in FIG. 4 and FIG. 10. At this time, the first element 110 is mounted on the second element 122.

Additionally, a first groove 143 is formed on the end (e.g., third retaining portion) 142 of the fixing pin 140, and a second groove 134 is formed on the guiding element 130, as shown in FIG. 6 and FIG. 9. Thus, tools, such as screwdrivers, can be inserted into the first groove 143 and second groove 134 to turn the fixing pin 140 and guiding element 130, respectively.

Accordingly, since the guiding element 130 is rotated to move upward and downward in the guide hole 111, the height of the guiding element 130 is smaller than that of the guide hole 111.

The following description is directed to the method of using the lock structure 100, and should be clearly understood from the foregoing structural discussion.

As shown in FIG. 4 and FIG. 5, when the first element 110 is mounted on the second element 122, a screwdriver (not shown) is inserted into the second groove 134 of the guiding element 130 to rotate the guiding element 130 to move downward in the guide hole 111. Then, the fixing pin 140 is fit into the third through hole 131, guide hole 111, first through hole 112 and second through hole 121 in sequence to locate the first retaining portion 141 of the fixing pin 140 under the second element 122. At this time, the third retaining portion 142 of the fixing pin 140 pushes against the second retaining portions 133 of the guiding element 130. Then, the screwdriver (or other installation tool) is inserted into the first groove 143 of the third retaining portion 142 of the fixing pin 140 to rotate the fixing pin 140 by approximately 90 degrees. At this time, the first retaining portion 141 of the fixing pin 140 is also rotated by approximately 90 degrees. The screwdriver is inserted into the second groove 134 of the guiding element 130 to turn the guiding element 130 to move upward in the guide hole 111. Since the third retaining portion 142 of the fixing pin 140 pushes against the second retaining portions 133 of the guiding element 130, the fixing pin 140 is moved upward when the guiding element 130 is moved upward in the guide hole 111. Eventually, the first retaining portion 141 of the fixing pin 140 firmly pushes against the second element 122, as shown in FIG. 4 and FIG. 10. At this time, the first element 110 is mounted on the second element 122.

Accordingly, when the first element 110 is separated from the second element 122, the screwdriver is inserted into the second groove 134 of the guiding element 130 to rotate the guiding element 130 to move downward in the guide hole 111. Since the third retaining portion 142 of the fixing pin 140 pushes against the second retaining portions 133 of the guiding element 130, the fixing pin 140 is moved downward when the guiding element 130 is moved downward in the guide hole 111. At this time, the first retaining portion 141 of the fixing pin 140 is separated from the second element 122. Then, the screwdriver is inserted into the first groove 143 of the third retaining portion 142 of the fixing pin 140 to rotate the fixing pin 140 by approximately 90 degrees. At this time, the first retaining portion 141 of the fixing pin 140 is also rotated by approximately 90 degrees. Eventually, the fixing pin 140 is removed from the third through hole 131, guide hole 111, first through hole 112 and second through hole 121, such that the first element 110 is completely separated from the second element 122.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lock structure, comprising:
   a first element having a guide hole and a first through hole located co-axially with the guide hole;
   a second element disposed under the first element and having a second through hole aligned with the first through hole;
   a guiding element rotatably and movably disposed in the guide hole, wherein the guiding element has a third through hole aligned with the first through hole; and
   a fixing pin inserted through the third through hole, the guide hole, the first through hole and the second through hole and having a first retaining portion, wherein the first retaining portion is formed on the lower portion of the fixing pin and located under the second element, cross sections of the first through hole, second through hole and third through hole are co-axially aligned with the cross section of the first retaining portion of the fixing pin, the first retaining portion pushes against the second element when the fixing pin rotates at an angle, and the cross sections of the first retaining portion, first through hole, second through hole, and third through hole are substantially rectangular.

2. The lock structure as claimed in claim 1, wherein the guide hole is circular and formed with inner threads.

3. The lock structure as claimed in claim 2, wherein the guiding element is a hollow cylinder, and the outer surface of the guiding element is formed with outer threads that engage the inner threads of the guide hole.

4. The lock structure as claimed in claim 1, wherein the guiding element further comprises at least one second retaining portion formed in the third through hole.

5. The lock structure as claimed in claim 4, wherein the fixing pin further comprises a third retaining portion formed on the upper portion of the fixing pin, and the second retaining portion abuts the third retaining portion.

6. The lock structure as claimed in claim 5, wherein a first groove is formed on the third retaining portion.

7. The lock structure as claimed in claim 1, wherein a second groove is formed on the guiding element.

8. The lock structure as claimed in claim 1, wherein the height of the guiding element is smaller than that of the guide hole.

9. A method for using a lock structure having a first element, a second element, a guiding element and a fixing pin, the first element having a guide hole and a first through hole located under the guide hole, the second element disposed under the first element and having a second through hole corresponding to the first through hole, the guiding element rotatably and movably disposed in the guide hole and having a third through hole corresponding to the first through hole, the fixing pin having a first retaining portion formed on the lower portion of the fixing pin, comprising the steps of:

(a) rotating the guiding element to advance the guiding element into the guide hole;
   (b) fitting the fixing pin into the third through hole, guide hole, first through hole and second through hole to locate the first retaining portion thereof under the second element;
   (c) rotating the fixing pin by an angle in a first direction to rotate the first retaining portion thereof by the angle by inserting a tool in the first groove of the third retaining portion to turn the fixing pin;
   (d) rotating the guiding element to move the guiding element in the guide hole until the first retaining portion of the fixing pin abuts the second element;
   (e) rotating the guiding element to move the guiding element downward in the guide hole and separate the first retaining portion of the fixing pin from the second element;
   (f) rotating the fixing pin by an angle in a second direction opposite to the first direction to rotate the first retaining portion thereof by the angle; and
   (g) removing the fixing pin from the third through hole, guide hole, first through hole and second through hole to separate the first element from the second element;

wherein the guiding element further comprises at least one second retaining portion formed in the third through hole;

wherein the fixing pin further comprises a third retaining portion formed on the upper portion of the fixing pin, and the second retaining portion abuts the third retaining portion; and wherein a first groove is formed on the third retaining portion.

10. A method for using a lock structure having a first element, a second element, a guiding element and a fixing pin, the first element having a guide hole and a first through hole located under the guide hole, the second element disposed under the first element and having a second through hole corresponding to the first through hole, the guiding element rotatably and movably disposed in the guide hole and having a third through hole corresponding to the first through hole, the fixing pin having a first retaining portion formed on the lower portion of the fixing pin, comprising the steps of:

(a) rotating the guiding element to advance the guiding element into the guide hole;

(b) fitting the fixing pin into the third through hole, guide hole, first through hole and second through hole to locate the first retaining portion thereof under the second element; corresponding to the first through hole, the fixing pin having a first retaining portion formed on the lower portion of the fixing pin, comprising the steps of:

(a) rotating the guiding element to advance the guiding element into the guide hole by inserting a tool in the second groove of the guiding element to turn the guiding element;

(b) fitting the fixing pin into the third through hole, guide hole, first through hole and second through hole to locate the first retaining portion thereof under the second element;

(c) rotating the fixing pin by an angle in a first direction to rotate the first retaining portion thereof by the angle;

(d) rotating the guiding element to move the guiding element in the guide hole until the first retaining portion of the fixing pin abuts the second element;

(e) rotating the guiding element to move the guiding element downward in the guide hole and separate the first retaining portion of the fixing pin from the second element;

(f) rotating the fixing pin by an angle in a second direction opposite to the first direction to rotate the first retaining portion thereof by the angle; and (g) removing the fixing pin from the third through hole, guide hole, first through hole and second through hole to separate the first element from the second element;

wherein a second groove is formed on the guiding element.

11. A method for using a lock structure having a first element, a second element, a guiding element and a fixing pin, the first element having a guide hole and a first through hole located under the guide hole, the second element disposed under the first element and having a second through hole corresponding to the first through hole, the guiding element rotatably and movably disposed in the guide hole and having a third through hole corresponding to the first through hole, the fixing pin having a first retaining portion formed on the lower portion of the fixing pin, comprising the steps of:

(a) rotating the guiding element to advance the guiding element into the guide hole;

(b) fitting the fixing pin into the third through hole, guide hole, first through hole and second through hole to locate the first retaining portion thereof under the second element;

(c) rotating the fixing pin by an angle in a first direction to rotate the first retaining portion thereof by the angle;

(d) rotating the guiding element to move the guiding element in the guide hole until the first retaining portion of the fixing pin abuts the second element by inserting a tool in the second groove of the guiding element to turn the guiding element;

(e) rotating the guiding element to move the guiding element downward in the guide hole and separate the first retaining portion of the fixing pin from the second element;

(f) rotating the fixing pin by an angle in a second direction opposite to the first direction to rotate the first retaining portion thereof by the angle; and (g) removing the fixing pin from the third through hole, guide hole, first through hole and second through hole to separate the first element from the second element;

wherein a second groove is formed on the guiding element.

12. A method for using a lock structure having a first element, a second element, a guiding element and a fixing pin, the first element having a guide hole and a first through hole located under the guide hole, the second element disposed under the first element and having a second through hole corresponding to the first through hole, the guiding element rotatably and movably disposed in the guide hole and having a third through hole (c) rotating the fixing pin by an angle in a first direction to rotate the first retaining portion thereof by the angle;

(d) rotating the guiding element to move the guiding element in the guide hole until the first retaining portion of the fixing pin abuts the second element;

(e) rotating the guiding element to move the guiding element downward in the guide hole and separate the first retaining portion of the fixing pin from the second element;

(f) rotating the fixing pin by an angle in a second direction opposite to the first direction to rotate the first retaining portion thereof by the angle by inserting a tool in the first groove of the third retaining portion to turn the fixing pin; and (g) removing the fixing pin from the third through hole, guide hole, first through hole and second through hole to separate the first element from the second element;

wherein the guiding element further comprises at least one second retaining portion formed in the third through hole;

wherein the fixing pin further comprises a third retaining portion formed on the upper portion of the fixing pin, and the second retaining portion abuts the third retaining portion; and wherein a first groove is formed on the third retaining portion.

13. A method for using a lock structure having a first element, a second element, a guiding element and a fixing pin, the first element having a guide hole and a first through hole located under the guide hole, the second element disposed under the first element and having a second through hole corresponding to the first through hole, the guiding element rotatably and movably disposed in the guide hole and having a third through hole corresponding to the first through hole, the fixing pin having a first retaining portion formed on the lower portion of the fixing pin, comprising the steps of:
  (a) rotating the guiding element to advance the guiding element into the guide hole;
  (b) fitting the fixing pin into the third through hole, guide hole, first through hole and second through hole to locate the first retaining portion thereof under the second element;
  (c) rotating the fixing pin by an angle in a first direction to rotate the first retaining portion thereof by the angle;
  (d) rotating the guiding element to move the guiding element in the guide hole until the first retaining portion of the fixing pin abuts the second element;
  (e) rotating the guiding element to move the guiding element downward in the guide hole and separate the first retaining portion of the fixing pin from the second element by inserting a tool in the second groove of the guiding element to turn the guiding element;
  (f) rotating the fixing pin by an angle in a second direction opposite to the first direction to rotate the first retaining portion thereof by the angle; and
  (g) removing the fixing pin from the third through hole, guide hole, first through hole and second through hole to separate the first element from the second element;
wherein a second groove is formed on the guiding element.

* * * * *